No. 808,804. PATENTED JAN. 2, 1906.
W. M. ANDERSON.
GLASS FURNACE.
APPLICATION FILED AUG. 9, 1905.
2 SHEETS—SHEET 1.
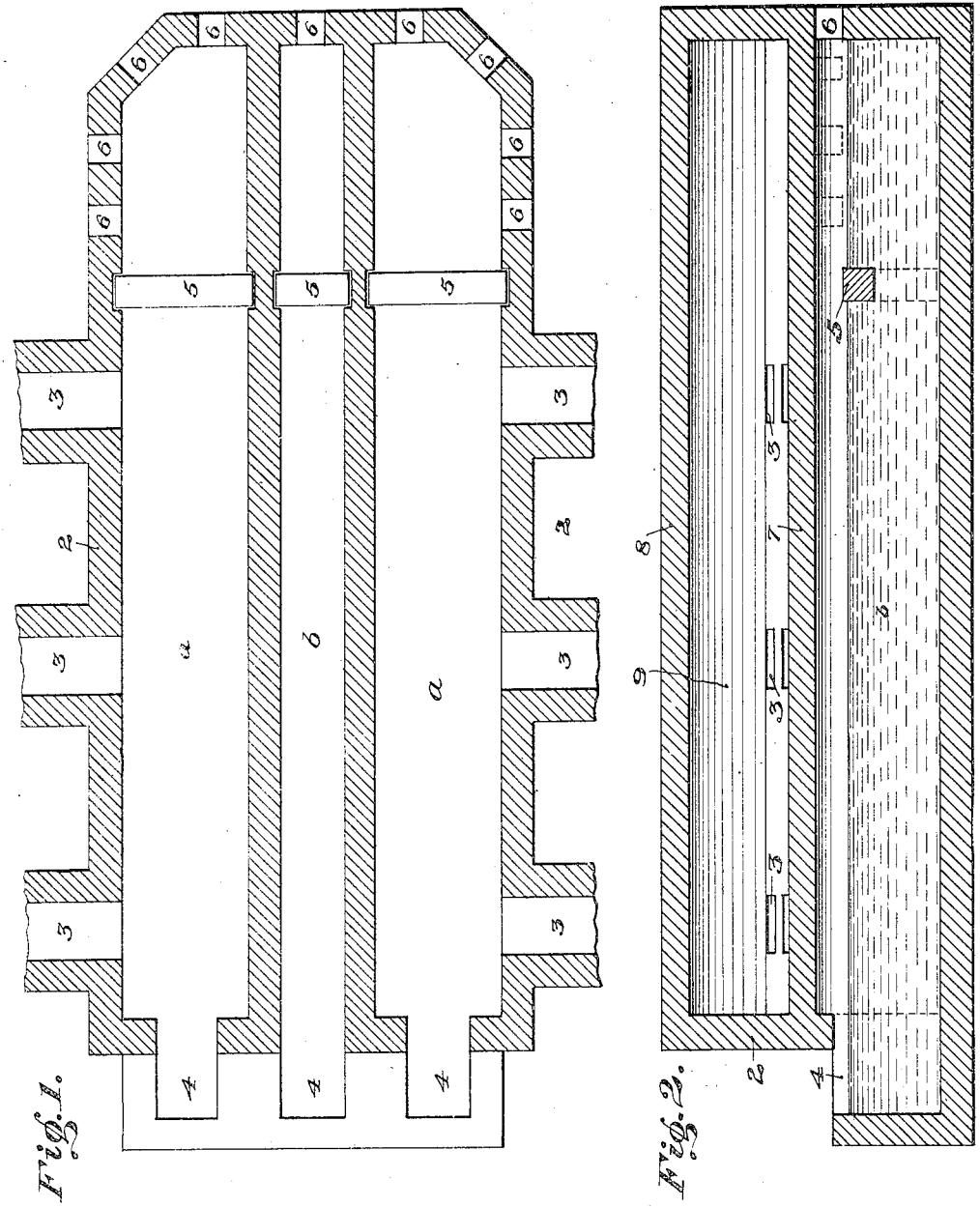

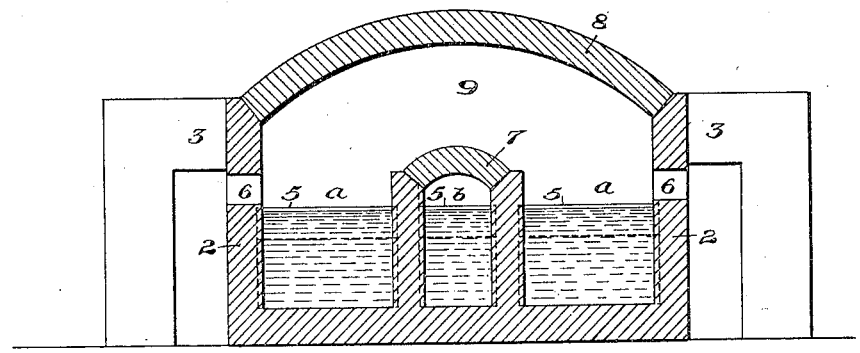
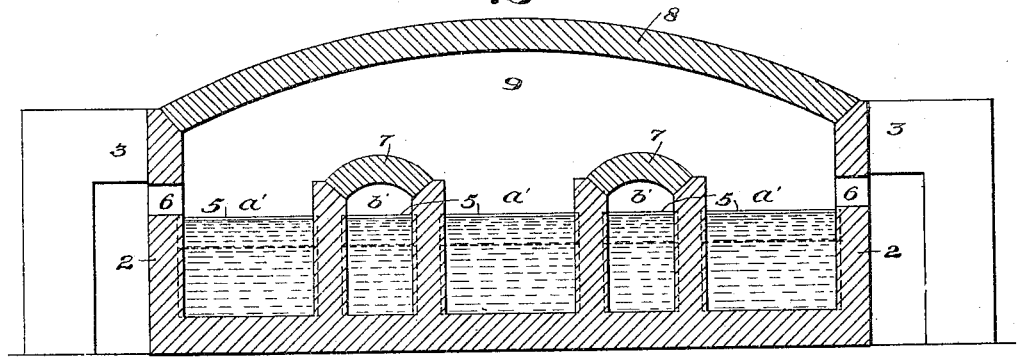
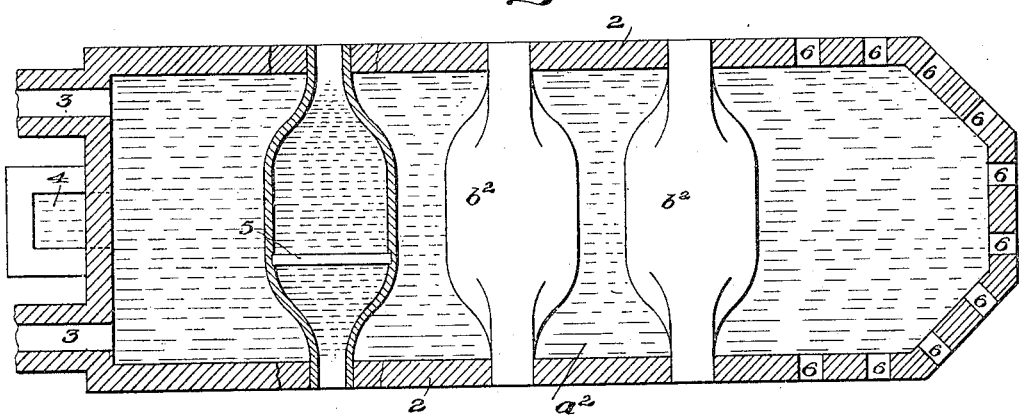

UNITED STATES PATENT OFFICE.

WILLIAM M. ANDERSON, OF PITTSBURG, PENNSYLVANIA

GLASS-FURNACE.

No. 808,804. Specification of Letters Patent. Patented Jan. 2, 1906.

Application filed August 9, 1905. Serial No. 273,360.

*To all whom it may concern:*

Be it known that I, WILLIAM M. ANDERSON, of Pittsburg, in the county of Allegheny and State of Pennsylvania, have invented a certain new and useful Glass-Furnace, of which the following is a full, clear, and exact description, reference being had to the accompanying drawings, forming part of this specification, in which—

Figure 1 is a horizontal sectional view illustrating my invention. Fig. 2 is a longitudinal vertical sectional view of the same. Fig. 3 is a vertical cross-sectional view of the same. Fig. 4 is a vertical cross-sectional view of a modified form of furnace, and Fig. 5 is a horizontal sectional view of another modified form of furnace.

Like symbols of reference indicate like parts wherever they occur.

My invention relates to glass-furnaces—that is, furnaces adapted to the manufacture of glass and in which the batch is melted and from which the glass is taken in its molten state. These furnaces are generally of two distinct types—tank-furnaces, in which the batch is melted in an open tank or chamber, where it is subjected to the direct action of the flames' heat and products of combustion, and pot-furnaces, in which the batch is melted in closed pots, where it is protected from the direct action of the flames and products of combustion. Among the advantages of the tank-furnace is that it is much more rapid in its action, the batch being reduced to a molten state in a tank-furnace very much more rapidly than is possible in a pot-furnace and with a greatly-reduced expenditure of fuel. At the same time a tank-furnace is less expensive to build and keep in repair than is the case with the pots generally used in pot-furnaces. As is well known in the art, however, in the manufacture of certain kinds of glass and in the manufacture of the best grades of lead glass it is necessary to keep the glass separated from the direct action of the melting-flames, and this has been done by the use of the slow and expensive pot-furnace.

The object of my invention is to provide a furnace which may be employed in the manufacture of glass of different grades and by means of which the finest kinds of glass may be rapidly and economically melted without bringing the batch as it is melted and the molten glass in direct contact with the flame.

To this end it consists in a furnace having a closed chamber or series of chambers in which the batch may be melted without coming in contact with the flame and having a tank-chamber so placed at the side or sides of the closed chamber that the batch may be rapidly melted therein by the direct action of the flame and may impart melting heat to the batch in the closed chamber or chambers, thus melting the batch in the closed chamber much more rapidly and economically than is possible with the ordinary pot-furnace.

I will now describe my invention, so that others skilled in the art to which it appertains may manufacture and use the same.

In the drawings, 2 represents the outer walls of the furnace, 3 the heating-flues for the introduction of gaseous fuel, and 4 the chambers at one end of the furnace into which the batch is fed.

At each side of the furnace is a tank-chamber $a$ $a$, which chambers extend longitudinally the entire length of the furnace, and near the end farthest away from the batch-receiving chambers are the usual floats 5. At the end of the chambers $a$ $a$ are working openings 6 in the walls of the furnace, through which the molten glass is gathered or otherwise removed. Extending longitudinally the entire length of the furnace and situate between the two tank-chambers $a$ $a$ is the covered chamber $b$, which is also provided with a batch-feeding chamber 4, a float 5, and a working or gathering opening 6. The roof 7 of the chamber $b$ is preferably somewhat above the level of the molten glass in the tank-chambers, is considerably below the level of the roof 8 of the furnace, and it is adapted to protect the batch, the melting, and the molten glass in the chamber from the direct action of the flames in the combustion-chamber 9 of the furnace. In order to more rapidly heat the chamber $b$ by a large body of surrounding molten glass, I prefer to make the chambers $a$ each of greater width and capacity than the chamber $b$.

In Fig. 4 I show three tank-chambers $a'$ $a'$ $a'$ and two covered chambers $b'$ $b'$, and in Fig. 5 I show pots $b^2$ extending transversely across a single tank-chamber $a^2$. Many other modifications in the shape and construction of the furnace, the tank-chambers, the closed chamber, and the openings for removing the molten glass will suggest themselves to those skilled in the art. My improved furnace may also be combined with working and drawing chambers, and it may be used in connection with any suitable means for drawing, gathering, or delivering the molten glass.

The advantages of my invention result from the construction which enables the finer grades of glass to be rapidly and economically melted without undue expenditure of time, labor, and fuel and at much less cost of furnace buiding and repair than is the case with the ordinary pot-furnace.

The tank-furnaces may be adapted for continuous melting or for daily melting, as may be preferred.

Having thus described my invention, what I claim, and desire to secure by Letters Patent, is—

1. In a glass-furnace, the combination of an open melting-chamber and an inclosed melting-chamber separated from the open chamber and so situate as to be capable of absorbing heat from the open melting-chamber, substantially as specified.

2. In a glass-furnace, the combination of one or more open melting-chambers and one or more inclosed melting-chambers separated from the open melting-chambers and so situate as to be protected from the loss of heat by the outer open melting-chambers; substantially as specified.

In testimony whereof I have hereunto set my hand.

W. M. ANDERSON.

Witnesses:
 ALICE E. DUFF,
 C. E. EGGERS.